United States Patent [19]

Waschek

[11] 3,940,214

[45] Feb. 24, 1976

[54] DRILL BIT WITH DEBURRING DEVICE

[76] Inventor: Daryl E. Waschek, 1614 Sharon Drive, North Mankato, Minn. 56001

[22] Filed: Feb. 10, 1975

[21] Appl. No.: 548,250

[52] U.S. Cl. .................................. 408/26; 408/224
[51] Int. Cl.² .......................................... B23B 51/08
[58] Field of Search ....... 408/22, 26, 118, 119, 200, 408/224, 225, 226, 713, 714

[56] References Cited
UNITED STATES PATENTS 2,895,356   7/1959   Cogsdill .......................... 408/714 X
3,195,378   7/1965   Cogsdill ................................ 408/26

Primary Examiner—Travis S. McGehee
Attorney, Agent, or Firm—Douglas L. Carlsen

[57] ABSTRACT

A twist drill bit for drilling through metal and having a cutter recessed in the spiral portion of the drill auger and spring tensioned to be biased outwardly beyond the peripheral surface of the drill to remove burrs raised by the drill bit as it passes through the metal in either direction.

5 Claims, 4 Drawing Figures

U.S. Patent   Feb. 24, 1976   3,940,214
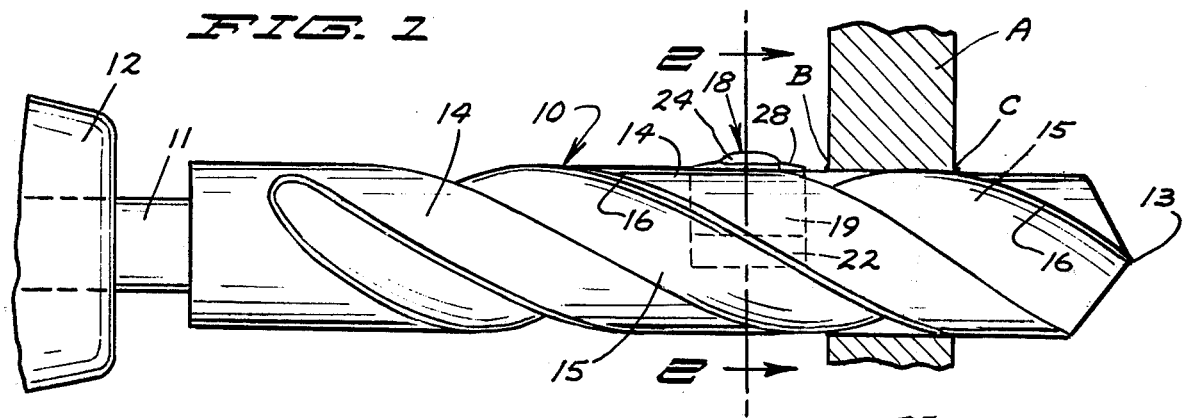
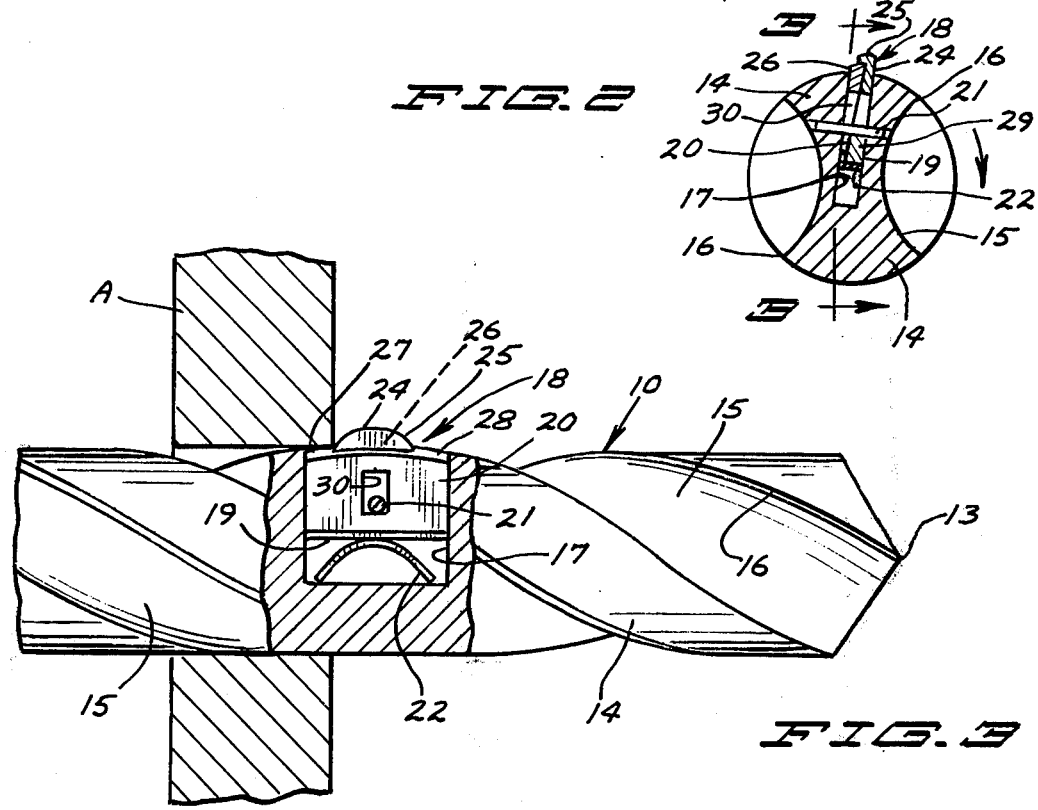
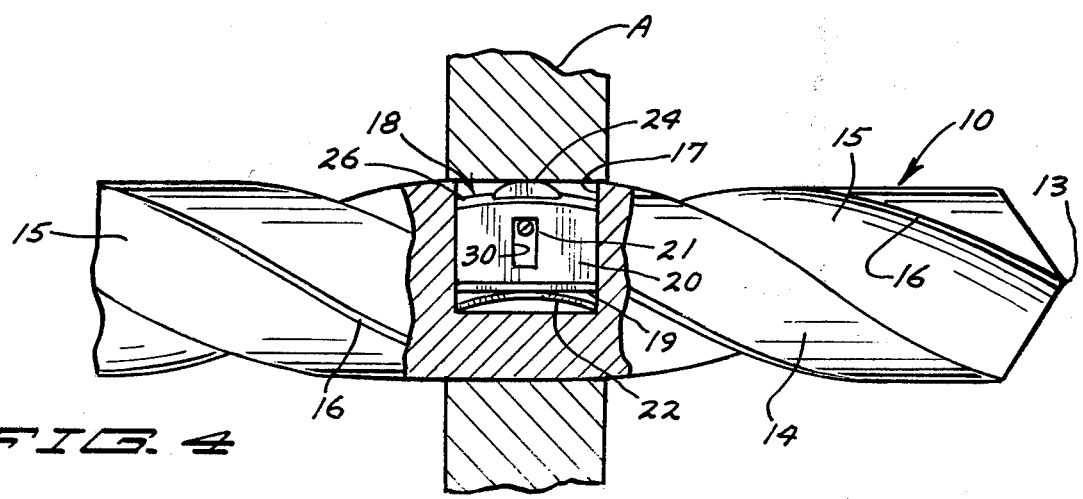

DRILL BIT WITH DEBURRING DEVICE

The invention relates generally to drill bits for drilling holes through metal sheets or parts and more particularly concerns an attachment mounted on the drill bit for removing burrs formed around the marginal portions of both the front and back sides of the hole drilled by the bit.

It is well known that in the drilling or tapping of holes in metal plate, for example, a sharp burr will be raised around the front edge of the hole as the drill bit enters the plate and a similar burr will be formed around the back side of the hole as the bit passes through the hole. Such burrs, not only cause a certain hazard in subsequent handling of the plate or workpiece involved but also prohibit flush contact of the plate with other parts in the area of the hole which is frequently desirable in assembly of a finished product. Accordingly it is generally necessary to remove the burrs by a separate boring or grinding operation which is both time-consuming and expensive.

In an effort to eliminate such additional operations various attempts have been made to incorporate a deburring device in the drill bit itself which will remove the burrs as the hole is drilled. Examples of such devices are found in U.S. Pat. Nos. 2,437,822 to Jones; 2,373,474 to Heyer; and 2,847,884 to Favre et al, copies of which are submitted with this application.

While the above mentioned prior art devices would appear to perform a reasonably effective deburring function, they are not believed to present a completely satisfactory solution to the problem for several reasons. First, at least Jones and Heyer would be quite expensive and could not be readily incorporated in a conventional bit. Secondly, in all cases the size of the deburring attachment cavity is so large that it would greatly weaken the overall strength of the bit. Thirdly, the attachments, with the possible exception of Heyer, are so flexible or yieldable as to give way and perhaps not perform the desired function in difficult hard metal deburring situations. Finally, and perhaps of greatest importance is the fact that all of these prior art deburring attachments are mounted in the shank portion of the drill bit and in fact by nature of their design can only be mounted there. As a result these structures have limited application and cannot be used unless there is ample clearance in the part being drilled to allow virtually the entire bit to pass through the drilled hole which is not always the case.

With these factors in mind the primary object of the present invention is to provide a deburring attachment which can be built into the spiral body portion of the drill bit so that it may be positioned near the pointed tip of the bit.

Another object of the invention is to provide a deburring attachment in a drill bit wherein the cutter performing the deburring function is positively locked in position during the deburring operation.

With these and other objects in view the invention broadly comprises providing an outwardly opening elongated recess in an auger portion of a drill bit extending longitudinally parallel to the bit axis but slightly inclined to the radius of the bit, a cutter having a sharp outer edge mounted in the recess for radial sliding movement between extended and retracted positions, a stop means acting between the cutter and bit to limit outward movement of the cutter, and a spring acting between the cutter and bit to bias the cutter toward its extended position. The invention also provides a wedging means for locking the cutter bar against inward movement against the bias of the spring means when there is inward pressure upon the outer edge of the cutter.

BRIEF DESCRIPTION OF THE DRAWINGS

In the drawings:

FIG. 1 is a side elevational view of a drill bit incorporating the deburring device forming the subject matter of the present invention with the bit in operative position in a drilled hole in a metal plate.

FIG. 2 is a sectional view through the bit and deburring device taken on line 2—2 of FIG. 1.

FIG. 3 is a fragmentary side elevational view of the bit partially broken away to show the deburring device in elevation and in the position it occupies during deburring of the back side of the drilled hole.

FIG. 4 is similar to FIG. 3 but showing the position of the deburring device as it passes through the drilled hole.

DESCRIPTION OF THE PREFERRED EMBODIMENT

Referring now more particularly to the drawing reference numerals will be used to denote like parts or structural features in the different views. The drill bit denoted generally at 10 has a shank 11 which fits into a chuck on a power source such as an electric drill 12. The bit 10 having a pointed end 13 is a two groove fluted twist drill with spiral auger portions 14 separated by grooves 15 and each having a spiral cutting edge 16 in the same manner as a conventional drill bit.

One auger portion 14 is provided with an outwardly opening socket in the form of an elongated narrow recess 17 having a uniform width throughout its length and depth. This recess serves as a socket or seat for holding the deburring attachment which is designated generally by the numeral 18. The recess extends longitudinally parallel to the axis of the bit but is preferably disposed at a slight angle to the radius of the bit as shown in FIG. 2 so in its outward extension it is inclined forwardly relative to the direction of rotation of the bit denoted by the arrow. This angle of inclination facilitates radial sliding of the attachment 18 within the bit during the boring operation.

The attachment 18 in the embodiment of the invention herein disclosed is made up of four components. They are a wedging element 19, a cutter 20, a holding pin 21 and a spring 22. Element 19 and cutter 20 are both generally rectangular plates of equal length and are disposed side by side within recess 17 having a sliding fit therewithin for radially inward and outward movement. The wedging element 19 has a cam 24 on its outer edge which hooks over the outer edge of the cutter 20 as at 25. It will be noted (FIG. 2) that element 19 tapers gradually in thickness in its outward extension from its inner edge to the hook 25 so as to have a wedge shape.

The cutter 20 tapers in thickness gradually in an inward direction so as to have a mating relation with element 19 whereby the overall thickness of the two elements combined is substantially constant. The outer edge of the cutter 20 is provided with sharp cutting edge 26 adjacent to the element 19 and over which the hook 25 engages. The end portions of edge 26 are inclined slightly on either side of the hook as denoted at 27 and 28 in FIG. 3.

The members 19 and 20 are respectively provided with aligned radially extending slots denoted respectively at 29 and 30. The holding pin 21 extends through the slots 29 and 30 and has its ends suitably fixed in the auger portion 14. The pin accordingly secures the members 19 and 20 within the recess 17 but permits limited radial sliding movement thereof. The spring 22 is bow shaped and is held under compression between the bottom wall of recess 17 and the inner edge of wedging element 19 to yieldably retain the element 19 in its outermost position in the recess as best observed in FIGS. 2 and 3. The spring is somewhat shorter in length than the recess 17 when it is not fully compressed.

Referring again to the wedging element 19 and the cutter 20 it will be noted that the cam 24 is centered on the cutter edge of element 19 so that the portions 27 and 28 of cutting edge 26 of member 20 are exposed on either side of the cam. The slots 29 and 30 and pin 21 are so positioned as to normally leave the edge 26 projecting slightly beyond the peripheral surface of the auger portion 14 as shown in FIGS. 1 and 2.

During the normal drilling operation, as the bit 10 is used to bore a hole through the metal plate A, as shown in FIG. 1, slight burrs denoted at B and C will be formed respectively at the front and back sides of the hole. Then as the attachment 18 advances into the hole the edge 28 of the cutter 20 will cut into and remove the burr B to provide a smooth edge around the front side of the hole.

When the cutter 20 first engages the plate A there will, of course, be a substantial amount of pressure applied to the cutter tending to depress it inwardly into the recess 17. However, the wedging engagement of wedging element 19 against the cutter locks the cutter in its extended position.

After the burr B has been removed and with continued advancement of the bit through the hole, the cam 24 will engage the front edge of the opening and the inward pressure on the cam will depress the wedging element 19 into recess 17 against the bias of spring 22 to the position shown in FIG. 4. Element 19 by virtue of its hook portion 25 in engagement over the edge 26 will also move the cutter 20 to a retracted position.

As the bit progresses the attachment 18 will pass through the hole and will again be projected to its outermost position shown in FIGS. 1 and 2. When the bit is withdrawn from the plate and the drill still in operation the edge 27 of the cutter will remove the burr C (FIG. 3) and the cam 24 will again cause retraction of the deburring attachment to the position shown in FIG. 4 during the withdrawal movement. The disposition of the recess 17 and attachment 18 at a slight angle to the radius of the bit, while not absolutely essential, seems to facilitate sliding action of the attachment between its extended and retracted positions.

The deburring attachment can be mounted in standard drill bits and the elements 19 through 22 readily replaced if necessary.

Having now therefore fully illustrated and described my invention, what I claim to be new and desire to protect by United States Letters Patent is:

1. In a drill bit for drilling a hole through a piece of metal whereby burrs are formed on the edges of the hole, said bit having a shank for connection to a power source and a boring body comprising spiral auger portions separated by spiral grooves,
   a. one of said spiral auger portions having an outwardly opening recess therein,
   b. a deburring attachment disposed in said recess for radial sliding movement between outwardly extended and retracted positions,
   c. stop means on the auger portion engaging said attachment to limit outward sliding movement thereof,
   d. spring means disposed between the bit and the attachment yieldably biasing the attachment toward its outwardly extended position, and
   e. said attachment including a cutter having a sharp outer cutting edge projecting beyond the peripheral surface of the auger portion to remove said burrs from the metal portions surrounding the hole.

2. The subject matter of claim 1 wherein the recess extends longitudinally parallel to the axis of the bit but outwardly at an angle to a radial direction from said axis and inclined forwardly relative to the direction of rotation.

3. The subject matter of claim 1 wherein the stop means comprises a radially directed slot in the cutter and a pin extending crosswise through the slot with its ends fixed in the adjacent spiral auger portions.

4. The subject matter of claim 1 wherein the deburring attachment is provided with a cam member positioned medially along said outer cutting edge of the cutter which is adapted to engage the edge of the hole and cause the attachment to move to its retracted position as the central portion of the cutter moves through the hole.

5. The subject matter of claim 1 wherein said deburring attachment includes a wedging element positioned for wedging engagement with the cutter when the attachment is in its outwardly extended position to securely hold the cutter as it engages and removes said burrs.

* * * * *